Oct. 13, 1970   W. H. CROWELL ET AL   3,534,402
APPARATUS FOR DETERMINING THE UNIFORMITY OF WEB MATERIAL
Filed Dec. 15, 1967   7 Sheets-Sheet 1

INVENTORS.
WILLIAM H. CROWELL
BRIAN I. HUNT
BY
J. Donald Weber
ATTORNEY.

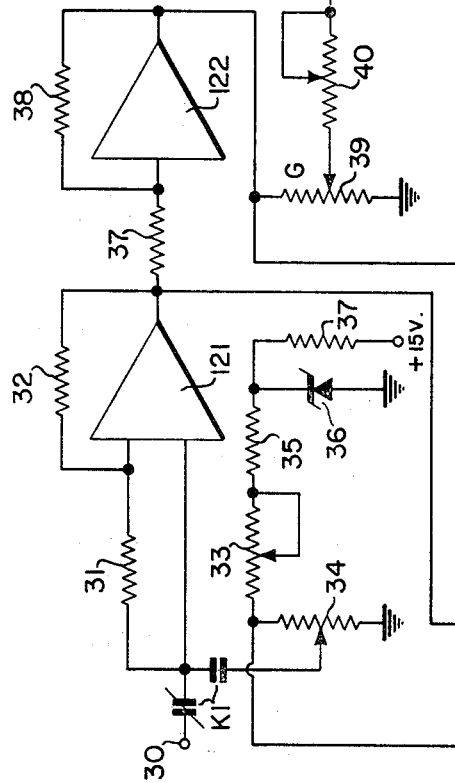

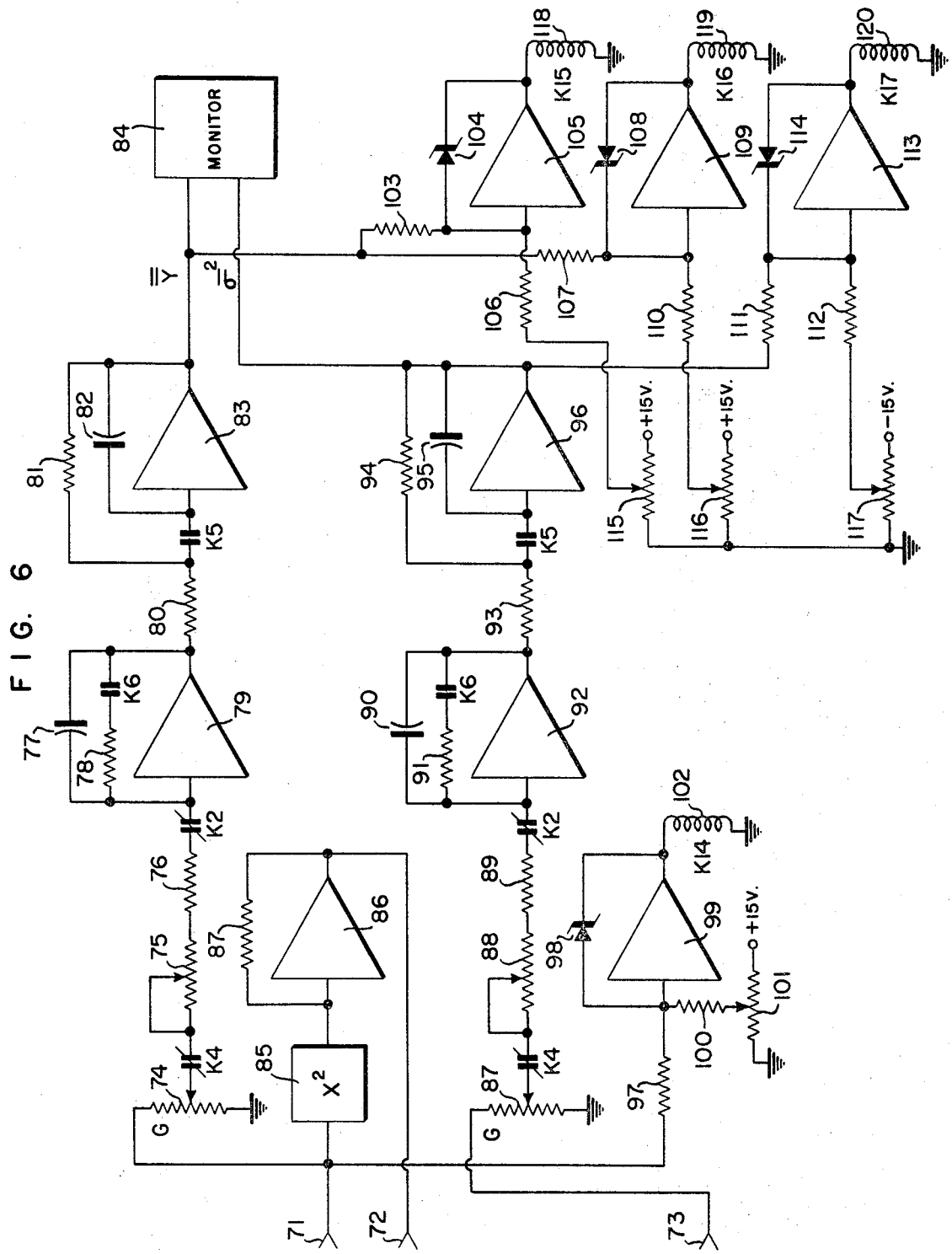

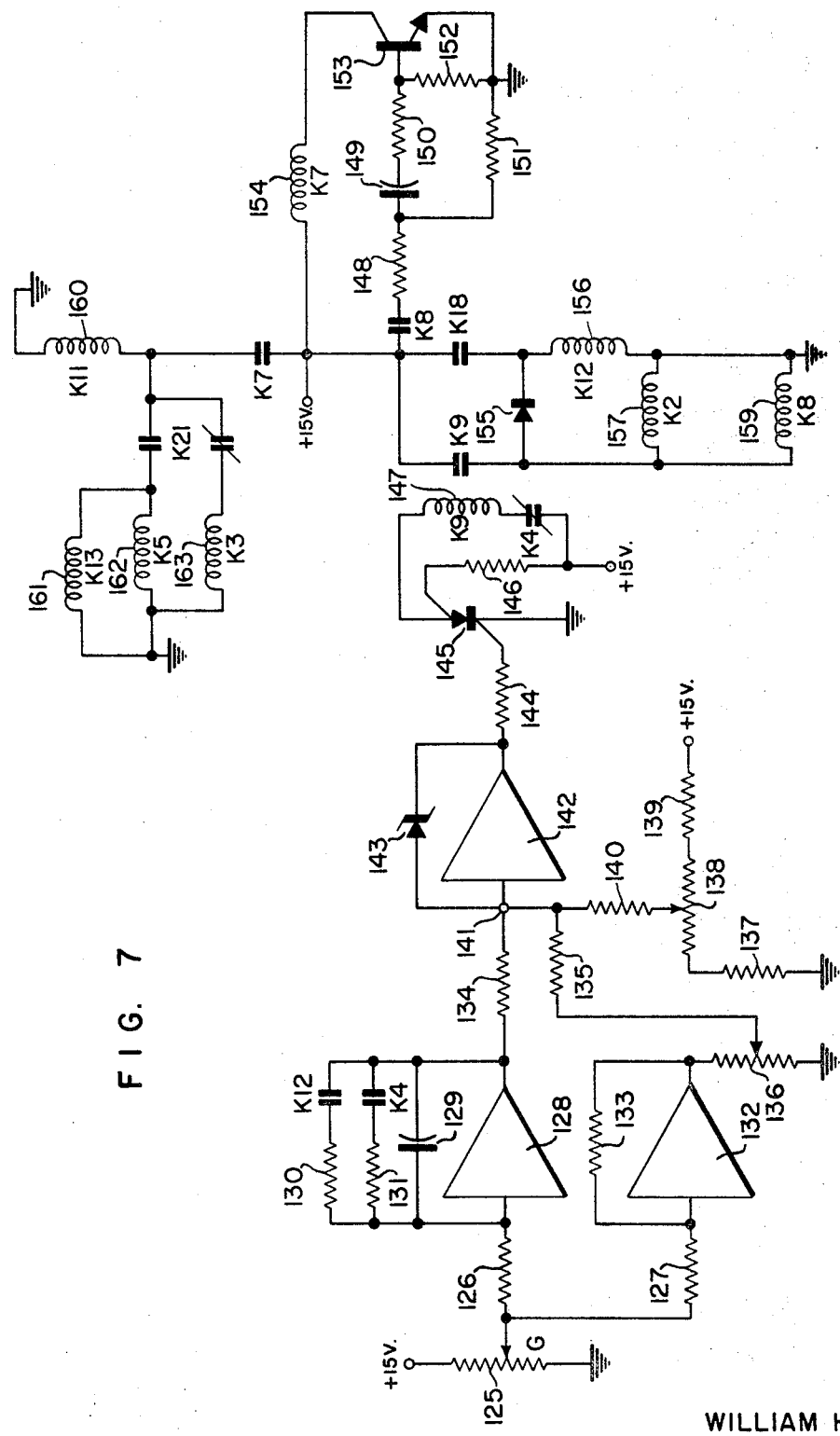

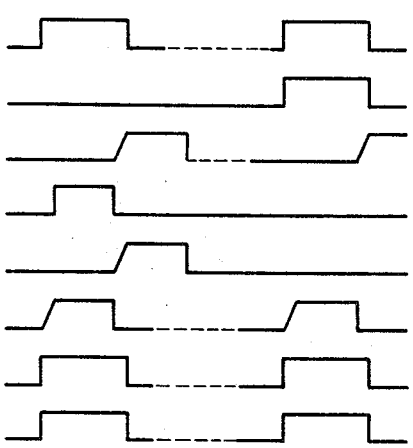
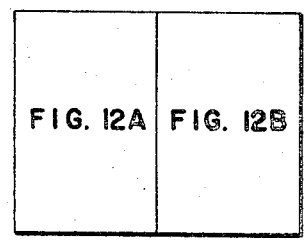
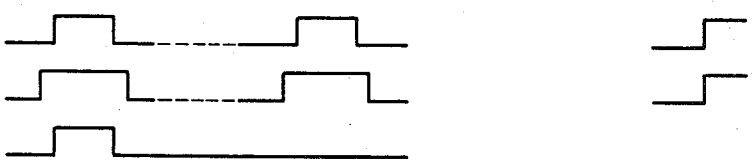
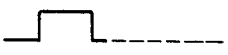
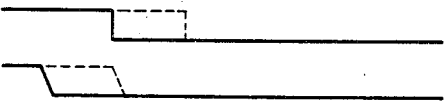
FIG. 12B
FIG. 12
INVENTORS.
WILLIAM H. CROWELL
BRIAN I. HUNT

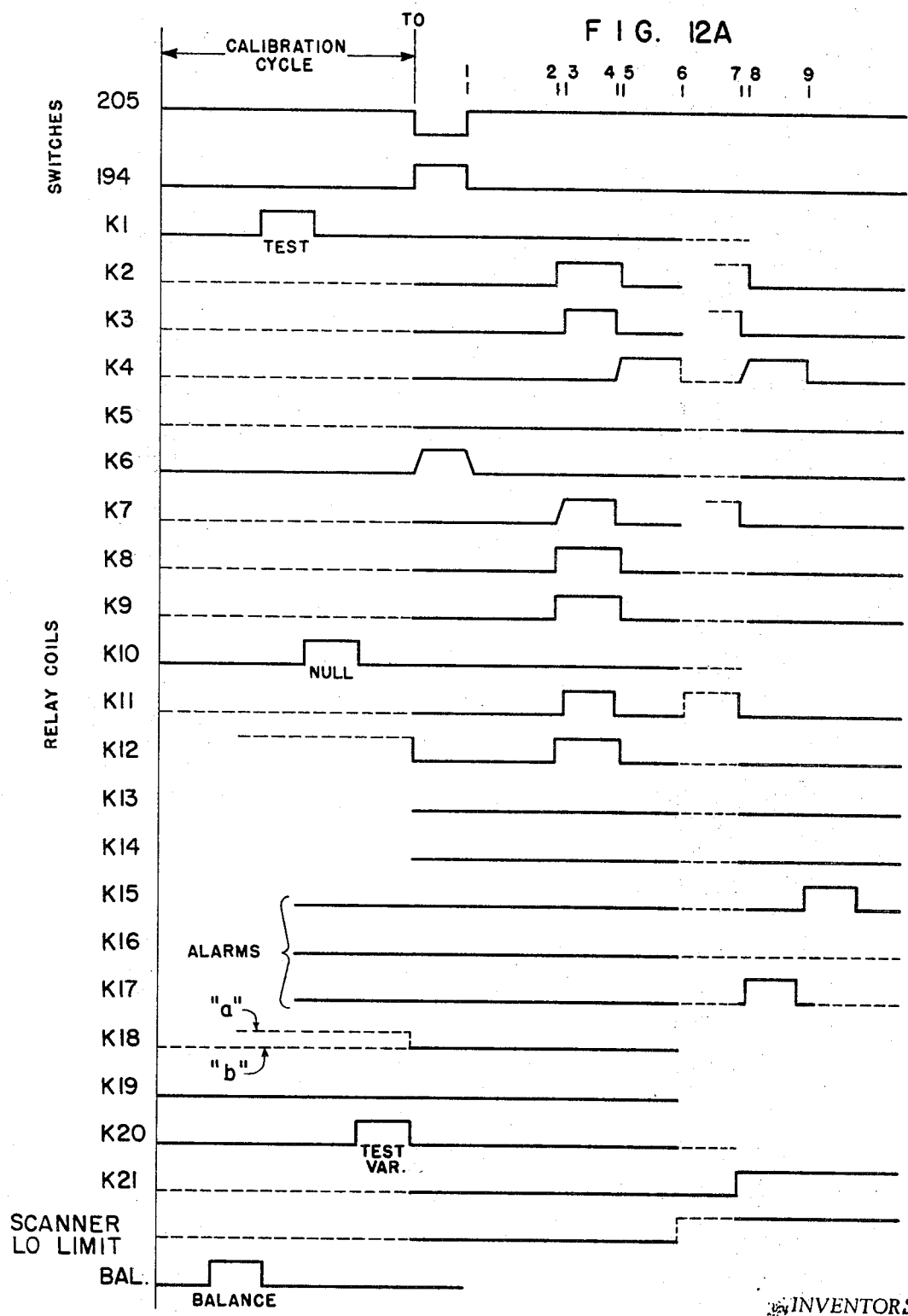

United States Patent Office 3,534,402
Patented Oct. 13, 1970

3,534,402
APPARATUS FOR DETERMINING THE UNIFORMITY OF WEB MATERIAL
William H. Crowell, Lansdale, and Brian I. Hunt, Warminster, Pa., assignors to Honeywell Inc., Minneapolis, Minn., a corporation of Delaware
Filed Dec. 15, 1967, Ser. No. 690,815
Int. Cl. G01n 21/32; G06g 7/19
U.S. Cl. 235—151.1                                3 Claims

ABSTRACT OF THE DISCLOSURE

A system is described which is used in continuously determining the uniformity of a fabric or similar web as a function of the light transmission of the fabric. Means are provided for measuring the light intensity and thus the web density and computing the uniformity of the web density.

---

The subject system is designed for use in continuously determining the uniformity of a web-like material. For example, a web may be cloth or a non-woven fabric or the like. The measurement of the uniformity of the web is made on the basis of a mathematical model which relates to the light transmission through the fabric or web. In the technique utilized, the light transmission is related to the web density by a Beer's Law relationship or a modified version thereof such that variation in web density, as determined by the variations in light transmittance, are directly related to web nonuniformity.

Several measures of fabric nonuniformity are made. These measurements include a mean density ($\overline{Y}$) of a sample, the average density ($\overline{\overline{Y}}$) of a plurality of samples, the variance of the density ($\sigma^2$) of a sample and the average variance ($\overline{\sigma^2}$) of the plurality of samples.

In this invention, a plurality of photosensor assemblies are arranged across the width of a web which is passed adjacent thereto. The light transmitted through the fabric is detected and operated upon by the photosensing assemblies thereby generating a current proportional to the transmittance of the web. A standard sample length of the web, in the direction travelled, is analyzed and detected by each of the plurality of photosensing assemblies. The photosensor assemblies are operated sequentially in order to analyze, sequentially, segments of the web across the width thereof. The $\overline{Y}$ and $\sigma^2$ signals are generated for each of the samples as follows. Thus, $$\overline{Y} = \frac{1}{T} \int_0^T fn(t)dt$$

and $$\sigma^2{}_{Yn} = \frac{1}{T} \int_0^T (fn(t) - \overline{Y}n)^2 dt$$

where the subscript "$n$" is used to signify which of the exemplary seventeen lateral segments is being scanned at the moment, and where $fn(t)$ represents the instantaneous value of light transmitted through the web at any instant. The equations are standard statistical equations for determining the mean transmission for a predetermined period T and the variance from that mean during the same period.

In order to evaluate the signals generated by each of the samples during a complete test of the full width of the web (i.e. the analysis by each of the photosensing elements), the signals $\overline{\overline{Y}}$ and $\overline{\sigma^2}$ are utilized, as follows $$\overline{\overline{Y}} = \sum_{n=1}^{P} \frac{\overline{Y}n}{P}$$

and $$\overline{\sigma^{-2}}{}_{Yn} = \frac{\sum_{n=1}^{P} \sigma^2{}_{Yn}}{P}$$

Where $fn(t)$ represents the intensity of the light transmitted through the web and P represents the number of segments analyzed. These intensity signals are operated upon and control the web handling apparatus or indicating means for recording the instantaneous conditions of the web.

Consequently, one object of this invention is to provide a web handling apparatus.

Another object of this invention is to provide a web handling apparatus wherein uniformity of a web is examined.

Another object of this invention is to provide a web handling apparatus wherein a web is examined and nonuniformity hereof is measured.

Another object of this invention is to provide a web handling apparatus including a computing apparatus.

Another object of this invention is to provide a web handling apparatus wherein a computing apparatus indicates various characteristics of the web.

These and other objects and advantages of this invention will become more readily apparent when the following description is read in conjunction with the drawings, in which.

Figure 8:
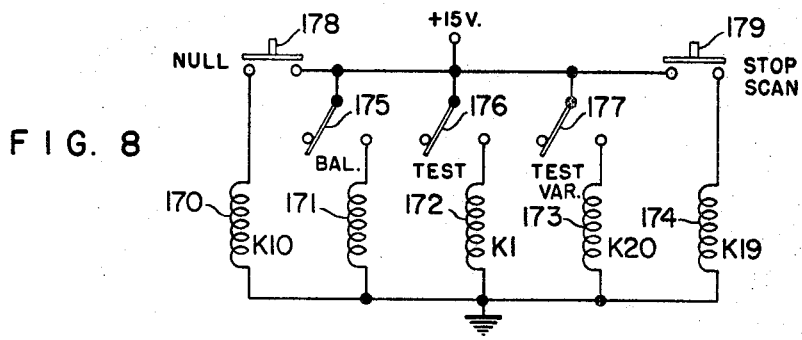
Figure 9:
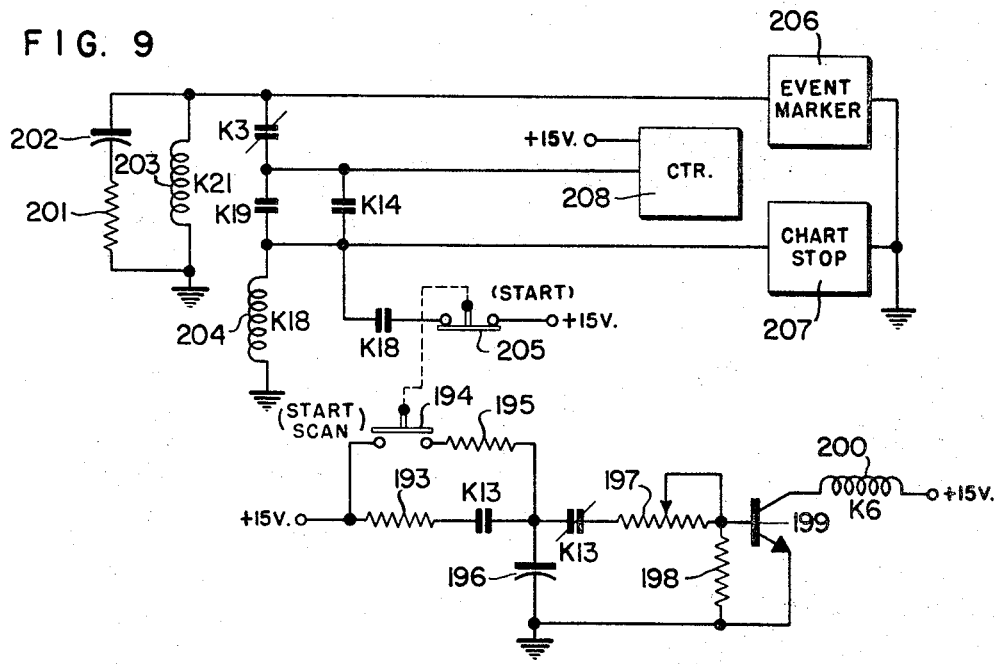
Figure 10:
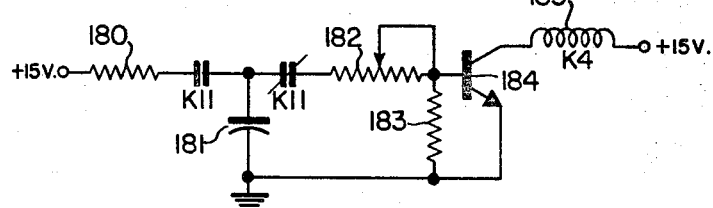
Figure 11:
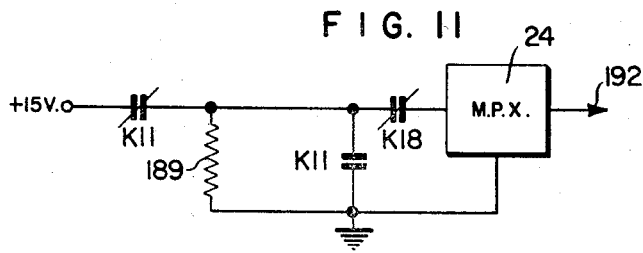

FIG. 4 suggests the manner of arranging FIGS. 5 and 6;

FIGS. 5 and 6 are schematic diagrams of the computing apparatus;

FIG. 7 is the main timing control circuit associated with the computing circuits in FIGS. 5 and 6;

FIG. 8 is a control circuit used for calibrating and the like of the computer shown in FIGS. 5 and 6;

FIGS. 9, 10 and 11 are schematic diagrams of control circuits used with the computer circuit shown in FIGS. 5 and 6; and FIG. 12 is a timing diagram, consisting of FIGS. 12A and 12B, which shows the operative relationship of the relays and swiches of the circuits.

In the several figures, similar components bear similar reference numerals. In addition, all relay contacts are shown in the condition determined when the associated coil is in the deenergized condition. Of course, the relays may be replaced by other suitable switching means such as semiconductors or the like.

Figure 1:
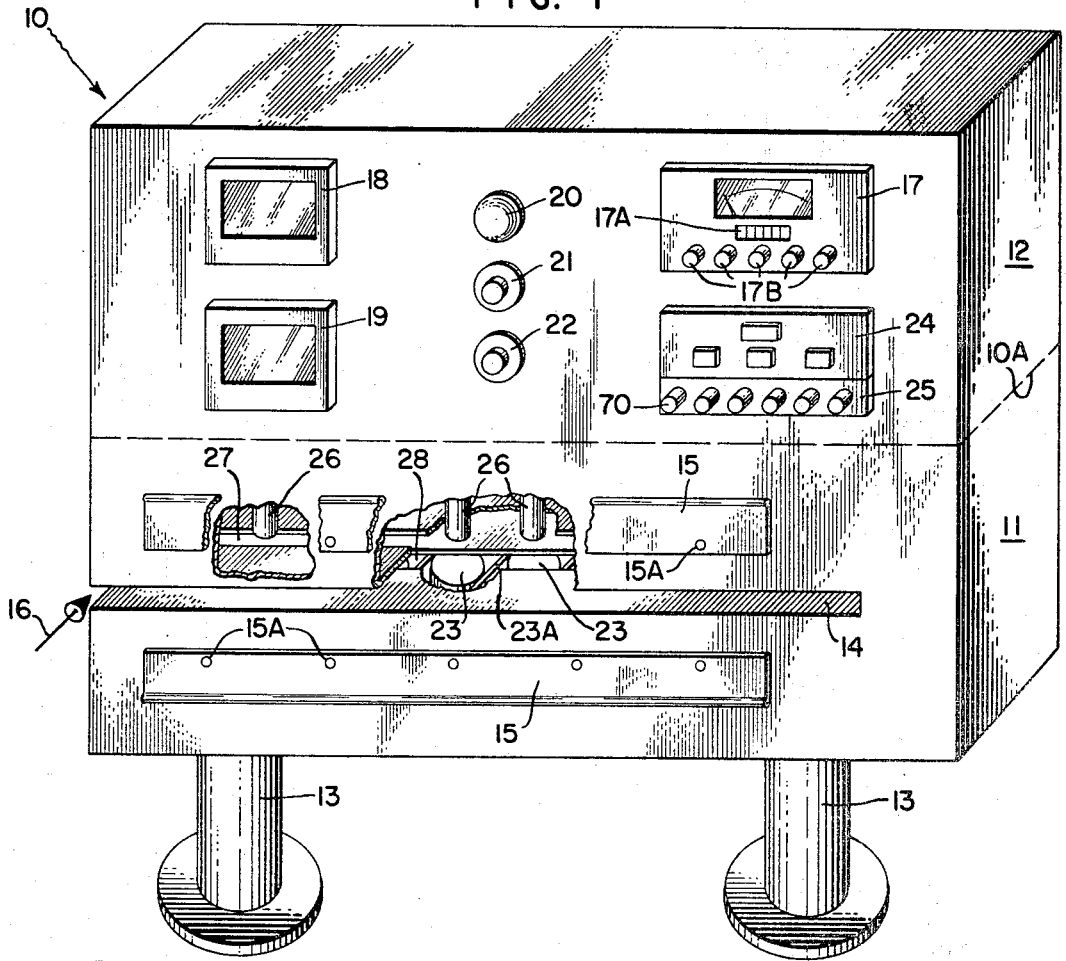
FIG. 1 is a schematic diagram of the measuring apparatus.

Referring now to FIG. 1, there is shown the measuring apparatus or "head" of the web handling apparatus. The "head" 10 may be a single unit or may comprise the measuring unit 11 separate from the control unit 12. A dashed line 10A is indicative of a typical line of separation of the elements. The elements may be completely separate and free standing or adjoined as shown.

As shown, the head 10 is supported by suitable support means such as legs 13. A channel 14 is located intermediate the upper and lower portions of the measuring unit 11. The channel 14 is designed to be sufficiently long to handle the maximum width fabric to be examined. The fabric or web is passed through the channel 14, for example in the direction shown by arrow 16. Access openings are included in at least one surface of the upper and lower portions of measuring unit 11 whereby access to photosensing devices is permitted. The doors 15 are hinged at access openings and are held in the closed position by suitable means 15A.

In the lower portion of the measuring unit 11, for example, there are mounted a plurality of light sources 23. In a preferred embodiment, 17 of these sources are mounted about 8 inches from the web path for optimum results. The bottom portion of channel 14 includes a narrow slit 28 in the upper surface thereof through which light from source 23 passes. Suitable partitions 23A may be utilized to avoid light scattering in a horizontal direction to interfere with an adjacent photosensing assembly. In addition, the upper surface of channel 14 includes a narrow slit 27 adjacent to which are located a plurality of photosensitive cells 26. Each of the photocells 26 is associated with a separate light source 23 and spaced about 8 inches from the web path for optimum results. Thus, as light passes from source 23, through the web (not shown), and is received by photocell 26, the density of the web is measured as a function of the intensity of the light detected at photocell 26.

The control unit 12 includes a scanner control 24 which determines which of the photocell outputs is to be operated upon and analyzed. In effect, scanner control 24 operates as a multiplexing device between the photocell outputs and the computing circuitry such that only one photocell at a time provides a signal to the computing circuitry described infra. An adjustment device 25 includes a plurality of potentiometers 70. Each potentiometer 70 is associated with a separate photocell 26 as shown in detail in FIG. 3. By adjusting potentiometer 70, the output signal produced by the associated photocell can be regulated and normalized.

The computing device 17 sequentially receives signals from scanner control or multiplexor 24 which signals are the output signals produced by the individual photocells 26. Computing device 17 includes a plurality of switches 17A which permit various control functions such as calibration, stop and start and the like. Additional adjustments such as system constants and the like are provided by potentiometers 17B.

A pair of chart recorders 18 and 19 are utilized to record the functions generated by the computer. For example, chart recorder 18 may record the $\overline{Y}$ and $\sigma^2$ signals produced by the computing circuitry in accordance with the signals produced by the individual photocells 26. On the other hand, chart recorder 19 may indicate the $\overline{\overline{Y}}$ and $\overline{\sigma^2}$ signals which are also produced by the computing circuitry when an analysis is made of the full width of the web.

The elements 20, 21 and 22 are suitable switches or alarms. Elements 20 is typically a visual alarm which indicates the condition of the web with respect to predetermined requirements. For example, a break in the fabric or excessively large variations in the density thereof are specifically indicated. Element 21 is an audible alarm which indicates a fabric break or the like. Element 22 includes a potentiometer whereby the voltage applied to the light sources 23 is adjusted. Thus, as the sources age, a higher voltage is applied in order to maintain the brightness thereof at a substantially constant level.

Figure 2:
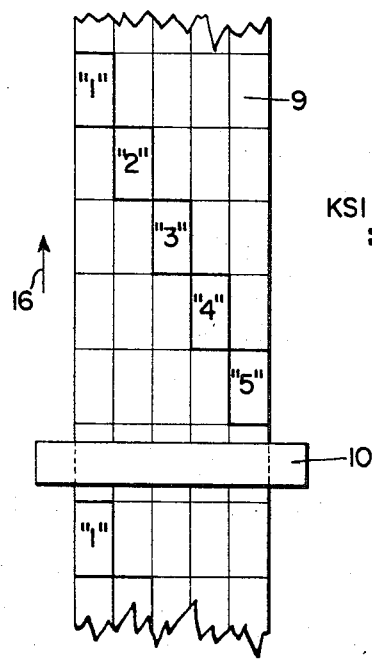
FIG. 2 is a diagrammatic showing of a typical web including an arrangement of sequential scanning areas.

Referring now to FIG. 2, there is shown a schematic representation of a typical web including the arrangement of the sequential scanning areas. Although not so limited, a web 9 is shown as including five parallel web segments each of which is associated with a separate photosensing apparatus. Each of the segments "1" through "5" have a uniform width and uniform length. The width and length of the scanned areas are a function of the width and speed of motion of the web which moves in the direction represented by arrow 16. The web 9 passes through the measuring apparatus 10 as shown. Moreover, as shown, a portion of the web between the last scanning area of one complete scan and the first scanning area of the subsequent scan is not examined. This area is shown under the measuring apparatus 10 in FIG. 2. As will be noted hereinafter, during the time when the unscanned portion of the web 9 is passing through measuring apparatus 10, the computing circuitry 17 is performing the summing function for the individual signals produced by the end of examination of the individual scanning areas. It is to be understood, that the number of scanning areas is not limited to those shown. In fact, in a preferred embodiment 17 parallel scanning areas are provided. Moreover, the length of the scanning area as suggested supra, is a function of the speed of the web and is, therefore, not necessarily fixed in different applications. As will be seen hereinafter by suitable adjustments of resistors, the web speed may be simulated such that the scan length is constant or, in an alternative embodiment (not shown) the scan time may be made constant regardless of web speed.

Figure 3:
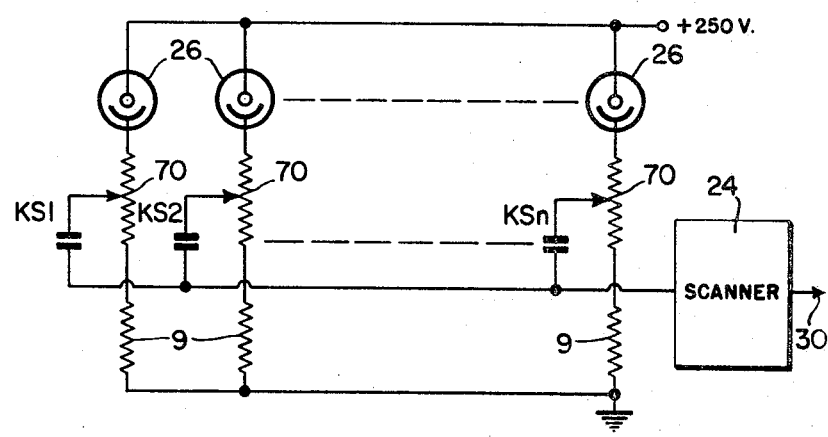
FIG. 3 is a schematic diagram of the photosensing circuitry.

Referring now to FIG. 3, there is shown a schematic diagram of the sensing network which provides the signals to the computer circuitry shown hereinafter. A plurality of photosensors 26 each have the cathode thereof connected to a +250 volt source. A separate series network comprising a resistor 9 and a variable resistor 70 (see FIG. 1) is connected between ground and the anode of each of the photosensors 26. The resistor network is provided to produce an adjustable voltage drop thereacross inasmuch as each photosensor produces a current output signal. The resistors 9 are used to produce a suitable base voltage drop while the variable resistors 70 provide adjustment capability. The variable tap of each of the resistors 70 is connected to output terminal 30 via a separate set of normally open relay contacts KS1, KS2, . . . KS$n$. The relay contacts are controlled by the operation of scanner 24 and are sequentially closed such that the voltage at the wiper arms of resistors 70 may be detected both in calibration and actual operation of the subject measuring apparatus. Thus, by suitably adjusting the individual resistors 70, the signal produced at terminal 30 is normalized for all of the photosensors 26.

Referring now to FIG. 4, there is shown a block diagram of the relationship between FIG. 5 and FIG. 6. FIGS. 5 and 6 may be considerd to be connected together as shown.

Referring now to FIGS. 5 and 6, there is shown a schematic diagram of the computing circuit per se. The timing and control circuits are shown and described infra. In FIG. 5, input terminal 30 is connected to the scanner output and receives the multiplexed signals. Input terminal 30 is connected via the normally closed contacts of relay K1 to the inverting input of amplifier 121. In addition, the non-inverting input of amplifier 121 is connected via resistor 31 to the inverting input of amplifier 121. The output of amplifier 121 is connected via feedback resistor 32 to the noninverting input thereof.

Amplifier 121 is connected as a follower amplifier and includes, for example, a higher impedance input. Typically, an FET differential amplifier is used to prevent significant loading of the input circuit. The output signal produced by amplifier 121 will be a 0 to +5 volt signal corresponding to the signal supplied by the scanner. As will be described, the scanner signal will vary between 0 and +5 volts as the percentage of light transmittance varies between 0 and 100%.

The inverting input of amplifier 121 is further connected to the variable tap of variable resistor 34 via the normally open contacts K1. One terminal of resistor 34 is connected to ground. Another terminal of resistor 34 is connected to one terminal of variable resistor 33. The variable tap of resistor 33 is connected to another terminal thereof and to one terminal of resistor 35. Another terminal of resistor 35 is connected to a +15 volt source via resistor 37. Zener diode 36 has the anode thereof connected to ground and the cathode thereof connected to the junction between resistors 35 and 37.

This circuit, including Zener diode 36, provides a precision voltage source. Typically, the potential detected at the junction between resistors 34 and 33 is +5.00 volts. This precision voltage is utilized in the calibration operation as described hereinafter.

The output of amplifier 121 is conected to an input of amplifier 122 via coupling resistor 37. The output of amplifier 122 is connected via resistor 38 to the input thereof. Amplifier 122 is a typical linear amplifier having a gain of 2, for example. This, the output signal produced by the amplifier 122 varies between 0 and +10 volts. Amplifier 122 may be eliminated in some cases but is utilized in the preferred embodiment to provide a signal compatable with the squarer 50 input requirements.

The output of amplifier 122 is applied across variable resistor 39 to ground. Variable resistor 39 provides a suitable attenuation function in the circuit. The variable tap of resistor 39 is connected to one terminal of variable resistor 40. The variable tap and another terminal of resistor 40 are connected together and to one terminal of resistor 41. Another terminal of resistor 41 is connected via the normally closed contacts K2 to the input of amplifier 44. The output of amplifier 44 is connected via capacitor 42 to the input thereof. Resistor 43 and normally open contacts K4 are connected in series with each other and in parallel with capacitor 42. Amplifier 44 is connected as an integrator with an adjustable time constant which, as a typical example, is 600 milliseconds.

The output of amplifier 44 is connected via coupling resistor 45 and normally open contacts K3 to the input of memory amplifier 49. The output of amplifier 49 is connected via terminal 71 to the circuitry shown in FIG. 6. In addition, the output memory of amplifier 49 is connected via resistor 46 to the junction between resistor 45 and contacts K3. Storage capacitor 47 is connected between the input and output of amplifier 49. The series combination of resistor 48 and normally open contacts K6 is connected in parallel with capacitor 47. Amplifier 49 is a gated, unity gain invertor with a typical first order lag not greater than one quarter of the transfer time from the integrator 44 to the memory amplifier 49. Amplifier 49 selectively stores the signal produced by amplifier 44 when contacts K3 are closed and produces the arithmetic mean signal designated $\overline{Y}$.

Returning now to the output of amplifier 121, a connection is made directly to the contacts of switch 65. Switches 65 and 69, which are ganged together, are utilized to select individual amplifiers for the calibration thereof. The armature of switch 65 is connected to the series combination of variable resistor 66 and resistor 67. Normally open contacts K10 are connected in parallel with the series connected resistors. The parallel network is connected to one terminal of meter 68. Another terminal of meter 68 is connected to the junction between the sets of normally open contacts and normally closed contacts of relay K10. The normally open contacts are further connected to the precision voltage source obtained at the junction between variable resistors 33 and 34. The normally closed contacts K10 are connected to the armature of switch 69. Other contacts of switches 65 and 69 are connected to the outputs of other amplifiers or to ground (dependent upon polarity). These other connections are omitted for clarity. The operation of this circuit is described hereinafter.

The output of amplifier 122 is connected to the squaring device 50. Squaring device 50 may be any suitable device known in the art. The output of squaring device 50 is connected to the input of amplifier 51. Feedback resistor 52 is connected between the output and the input of amplifier 51. The output of amplifier 51 is connected to ground via variable resistor 53. Thus, amplifier 51, in conjunction with squaring device 50 produces an output signal which is the square of the output signals with inverted polarity. The variable tap of attenuator resistor 53 is connected to one terminal of variable resistor 54. The variable tap and another terminal of resistor 54 are connected to one terminal of resistor 55. Another terminal of resistor 55 is connected via normally closed contacts K2 to the input of amplifier 58. The output of amplifier 58 is connected to the input thereof via integrating capacitor 56. Resistor 57 is connected in series with normally open contacts K4 and the series combination is connected in parallel with capacitor 56. Amplifier 58 operates as an integrator similar to amplifier 44.

The output of amplifier 58 is connected via coupling resistor 59 and normally open contacts K3 to the input of amplifier 64. The output of amplifier 64 is connected via resistor 61 to the junction between resistor 59 and contacts K3. The junction between resistors 61 and 59 is further connected via coupling resistor 60 to terminal 72 which is connected to the circuitry of FIG. 6 whereby an additional summing signal is applied. In addition, the output of amplifier 64 is connected to the input thereof via memory capacitor 62. The series combination of resistor 63 and normally open contacts K6 is connected in parallel with capacitor 62. Amplifier 64 operates as a memory circuit similar to amplifier 49.

The output of amplifier 64 is connected via normally closed contacts K20 to terminal 73. Terminal 73 is connected to the circuitry shown in FIG. 6 and is the point at which the variance signal $\sigma^2$ is detected. The junction between normally closed contacts K20 and terminal 73 is connected via normally open contacts K20 to the output of amplifier 121.

In FIG. 6, terminal 71 is connected to the input of squaring device 85 which is similar to the squaring device 50. The output of squaring device 85 is connected to an input of amplifier 86. Feedback resistor 87 is connected between the output and the input of amplifier 86. The output of amplifier 86 is connected to contact 72 which is connected to the circuitry shown in FIG. 5. Amplifier 86 is connected as an inverter and in conjunction with squaring device 85 produces a square of the $\overline{Y}$ signal with inverted polarity.

Terminal 71 is further connected to one terminal of variable resistor 74 which is referenced to ground. The variable tap of resistor 74 is connected via the normally closed contacts K4 to the variable tap and another terminal of resistor 75. A further terminal of resistor 75 is connected via resistor 76 and normally closed contacts K2 to the input of amplifier 79. The output of amplifier 79 is connected via integrating capacitor 77 to the input of amplifier 79. A series network comprising resistor 78 and normally open contacts K6 is connected in parallel with capacitor 77. Amplifier 79 is an integrator similar to amplifier 44.

The output of amplifier 79 is connected via coupling resistor 80 and normally open contacts K5 to the input of amplifier 83. Feedback resistor 81 is connected between the output of amplifier 83 and the junction between resistor 80 and contacts K5. Storage capacitor 82 is connected between the output and the input of amplifier 83. Amplifier 83 is connected as a memory circuit similar to amplifier 49. The output of amplifier 83 is supplied to a monitor 84 such as chart recorder 18 or the like.

The terminal 73 is connected to one terminal of variable resistor 87 which is referenced to ground. The variable tap of resistor 87 is connected via normally closed contacts K4 to the variable tap and another terminal of variable resistor 88. A further terminal of resistor 88 is connected via resistor 89 and normally closed contacts K2 to the input of amplifier 92. A storage capacitor 90 is connected between the output and the input of amplifier 92. In addition, a series network comprising resistor 91 and normally open contacts K6 is connected in parallel with capacitor 90. Amplifier 92 is an integrator similar to amplifier 79.

The output of amplifier 92 is connected via coupling resistor 93 and normally open contacts K5 to amplifier 96. The output of amplifier 95 is connected via feedback resistor 94 to the junction between resistors 93 and contacts K5. The output of amplifier 96 is further connected to the input thereof via storage capacitor 95. In addition, the output of amplifier 96 is connected to suitable monitor 84 which may comprise a chart recorder 19 or the like. Of course, monitor device 84 may include a plurality of chart recorders each of which receives a separate signal.

Input contact 71 is also connected via summing resistor 97 to the input of amplifier 99. A variable resistor 101 is connected between a +15 volt source and ground, for example. The variable tap of resistor 101 is connected via resistor 100 to the summing junction at the input of amplifier 99. The network including resistors 100 and 101 produces a controllable offset compensation voltage at the input of amplifier 99. The anode of Zener diode 98 is connected to the input of amplifier 99 while the cathode of diode 98 is connected to the output of amplifier 99. Amplifier 99 is further connected via coil 102 of relay K14 to ground. Amplifier 99 is connected as a voltage comparator which is utilized to detect the $\overline{Y}$ signal equal to +5.00 volts or 100% light transmission. This indication is produced, for example, when the web or fabric under inspection is broken. When the appropriate signal is received, amplifier 99 produces a signal which energizes coil 102 and effects the necessary control.

Amplifiers 105, 109 and 113 are also connected as voltage comparators. Amplifier 105 has the summing input junction connected to the output of amplifier 83 via resistor 103. In addition, resistor 106 is connected from the input to a voltage source. The voltage source comprises variable resistor 115 which is connected between a +15 volt source and ground and has the variable tap connected to resistor 106. The summing input of amplifier 105 is also connected to the anode of Zener diode 104. The cathode of Zener diode 104 is connected to the output of amplifier 105 and to coil 118 of resistor K15 which setpoint detector for the $\overline{\overline{Y}}$ signal and produces a signal to energize coil 118 when the appropriate input signals are applied.

Amplifier 109 has the summing input thereof connected via resistor 107 to the output of amplifier 83 as well. In addition, resistor 110 is connected between the summing input of amplifier 109 and a voltage source. The voltage source comprises variable resistor 116 connected between a +15 volt source and ground with the variable tap thereof connected to resistor 110. The output of amplifier 109 is connected via coil 119 of relay K16 to ground. In addition, Zener diode 108 is connected between the input and output of amplifier 109 with the anode connected to the output thereof. Amplifier 109 is mean low setpoint detector for the $\overline{Y}$ signal and produces a signal to energize coil 119 when the appropriate input signals are applied.

Amplifier 113 has the summing input connected via resistor 111 to the output of amplifier 96. In addition, resistor 112 is connected to the variable tap of resistor 117. Resistor 117 is connected between a —15 volt source and ground and supplies a voltage source to amplifier 113. The output of amplifier 113 is connected to ground via coil 120 of resistor K17. Zener diode 114 has the anode thereof connected to the output of amplifier 113 and the cathode connected to the input thereof. Amplifier 113 is the high setpoint detector for the $\sigma^2$ signal and produces a signal to energize coil 120 when the appropriate input signals are applied.

Coils 102, 118, 119 and 120 are energized when an undesirable condition of the web exists. Energization of any of these coils operates a suitable alarm circuit. The alarm circuit may stop the apparatus or merely indicate a malfunction for subsequent action.

Referring now to FIG. 7, there is shown a schematic diagram of the basic timing circuit. This circuit controls the operation of the computer circuit shown in FIGS. 5 and 6 when operation has been initiated on an automatic, continuous basis. A variable resistor 125 is connected between a +15 volt source and ground. Variable resistor 125 is connected between a +15 volt source and ground. Variable resistor 125 is ganged with variable resistors 39, 53, 74 and 87 noted supra. Resistor 125 is the speed control resistor wherein duration of the integration by amplifier 128 is controlled as a function of the web speed. The ganged resistors provide suitable attenuation to compensate for the speed control. The speed control in this embodiment allows a uniform scanning length to be utilized. The variable tap of resistor 125 is connected via resistor 126 to the input of amplifier 128. Integrating capacitor 129 is connected between the output and input of amplifier 128. A first series network including resistor 131 and normally open contacts K4 is connected in parallel with capacitor 129. A second series network comprising resistor 130 and normally open contacts K12 is also connected in parallel with capacitor 129. Amplifier 128 is connected in integrator configuration. Contacts K4 and K12 are separately closed to selectively short circuit and discharge capacitor 129 whereby a new integration cycle is permitted. The output of amplifier 128 is connected to summing junction 141 via resistor 134.

The variable tap of resistor 125 is further connected via resistor 127 to the input of amplifier 132. Feedback resistor 133 is connected between the input and output of amplifier 132. Amplifier 132 is connected in a linear amplification configuration. The output of amplifier 132 is connected to ground via variable resistor 136. The variable tap of resistor 136 is connected to summing junction 141 via resistor 135.

A voltage divider network comprising resistors 137, 138 and 139, in series, is connected between a +15 volt source and ground. Resistors 137 and 139 are large relative to variable resistor 138 which operates as a fine adjustment control. The variable tap of resistor 138 is connected to summing junction 141 via resistor 140.

Summing junction 141 is connected as an input to amplifier 142. Zener diode 143 is connected in the feedback path with the anode connected to the input of amplifier 142 and the cathode connected to the output of amplifier 142. The output of amplifier 142 is further connected via resistor 144 to the cathode gate of silicon controlled switch 145. The cathode of SCS 145 is connected to ground or suitable reference potential. The anode gate of SCS 145 is connected to a +15 volt source via resistor 146. The anode of SCS 145 is connected to the +15 volt source via coil 147 of relay K9 and normally closed contacts K4 which are connected in series.

One side of the normally open contacts of relay K9 is connected to ground via the parallel combination of coil 157 of relay K2 and coil 159 of relay K8. The same side of contacts K9 is connected to the anode of diode 155. The cathode of diode 155 is connected via coil 156 of relay K12 to ground. The junction between diode 155 and coil 156 is connected, via normally open contacts K18 to the other side of normally open contacts K9.

The second mentioned side of contacts K9 is connected via normally open contacts K8 to resistor 148. Resistor 148 is connected via capacitor 149 and resistor 150 to the base of transistor 153. Feedback resistor 151 is connected between the emitter of transistor 153 and the junction between resistor 148 and capacitor 149. A bias resistor 152 is connected between the base of transistor 153 and ground. The collector of transistor 153 is connected to a +15 volt source via coil 154 of relay K7.

The normally open contacts of relay K7 are connected, at one side to the +15 volt source and, at the other side, to ground via coil 160 of relay K11. The common junction between contacts K7 and coil 160 is connected to ground via normally closed contacts K21 and coil 163 of relay K3. Normally open contacts K21 and coil 162 of relay K5 are connected in parallel with the normally closed contacts K21 and coil 163. In addition, coil 161 of relay K3 is connected in parallel with coil 162.

Referring now to FIG. 8, there is shown a switching circuit which is used primarily for calibration and testing of the computer circuit. The control circuit of FIG. 8 comprises push-buttons 178 and 179, and switches 175, 176 and 177. Each of these switches is normally open as shown. The armature of switches 175, 176 and 177 are connected together and to a +15 volt source. Coils 170 (K10), 171, 172 (K1), 173 (K20) and 174 (K19) are associated with the switches 178, 175, 176, 177 and 179, respectively. Selective operation of these switches energizes the associated coil of the designated relay and produces the control function as noted hereinafter.

Referring now to FIG. 9, there is a schematic diagram of a control circuit which is utilized, especially, for initiating operation of the circuit. In FIG. 9, the start switch 205 and the start scan switch 194 are shown arranged in ganged relationship. Start switch 205, is normally closed, and connects a +15 volt source to normally open contacts K18. Another terminal of normally open contacts K18 is connected to the chart stop circuit 207. The second terminal of contacts K18 is further connected via coil 204 of relay K18 to ground.

Normally open contacts K19 and K14 are connected in parallel. One side of the parallel combination is connected to the second mentioned terminal of contacts K18. Another side of the parallel combination is connected to the input of the counter 208 which includes, inter alia, a contact which closes when the count 000 (or other designated low limit count) is achieved. This contact closure connects a +15 volt source to contacts K19 and K14.

In addition, normally closed contacts K3 are connected between the input to counter 208 and the input of event marker 206. Event marker 206 comprises suitable circuitry which produces a mark or other indication on the chart in the appropriate chart recorder.

Also connected to contacts K3 and the input of event marker 206 is the coil 203 of relay K21 which is referenced to ground. Series connected resistor 201 and capacitor 202 are connected in parallel with coil 203.

Referring now to FIG. 10, there is shown a schematic diagram of a control circuit which is utilized to control the resetting of certain amplifiers and interconnections of others in the computers shown in FIGS. 5 and 6. This control circuit includes resistor 180 which is connected between a +15 volt source and ground via normally open contacts K11 and capacitor 181. The junction between normally open contacts K11 and capacitor 181 is connected to normally closed contacts K11 which is further connected to the base of transistor 184 via variable resistor 182. The base of transistor 184 is connected to ground or similar reference potential source through resistor 183. The collector of transistor 184 is connected via coil 185 of relay K4 to a +15 volt source. Thus, coil 185 is energized or not in accordance with the condition of transistor 184.

Referring to FIG. 11 there is shown a further control circuit which is used to operate the multiplexer 24 such that different scanning areas are investigated. The control circuit includes normally closed contacts K11 which are connected in series with resistor 189 between a +15 volt source and ground. Normally open contacts K11 are connected in parallel with resistor 186. The junction between the sets of contacts K11 is further connected via normally closed contacts K18 to multiplexer 24 which is referenced to ground. Output terminal 192 of multiplexer or scanner 24 is applied to input terminal 30 of the computer.

The operation of the subject computational circuit is described by concurrent reference to all of the figures, especially the timing diagram of FIG. 12. Initially, the calibration cycle procedure is followed, as described hereinafter. In order to start the operation, switches 205 and 194 (FIG. 9) which are ganged switches are opened and closed, respectively. The opening of switch 205 at time T0 removes the +15 volt source from the contacts K18 connected to the switch. At the initial start-up, contacts K18 are open and this action is not essential. However, as will appear hereinafter, subsequent to the initial start-up, the contacts K18 will normally be closed due to prior action and coil 204 of relay K18 will be energized by the +15 volt source. When the +15 volt source is disconnected, coil 204 of relay K18 is deenergzied at time T0 thereby opening the sets of contacts K18 connected to switch 205 and to coil 156 of relay K12 (FIG. 7). Thus, coil 204 remains deenergized and the K12 short circuit is removed from across amplifier 128. In addition, contacts K18 connected to multiplexer 24 (FIG. 11) to provide the STEP SCANNER signal thereto are closed whereby the multiplexer is stepped when relay K11 is energized at T3.

Closure of switch 194 at time T0 by-passes normally open contacts K13 associated with resistor 193 and connects the +15 volt source to resistor 195 and, thence, via normally closed contacts K13 and resistor 197, to the base of transistor 199. The application of the signal to transistor 199 is, of course, a function of the charging time of capacitor 196 for example about 3 millisecond, as suggested by the diagonal line at time T0. When the potential across capacitor 196 is sufficiently large, transistor 199 is rendered conductive. Coil 200 of relay K6 is energized by conduction through transistor 199. When coil 200 is energized, the sets of contacts K6 connected in parallel with amplifier 49 and 64 of FIG. 5 and amplifiers 79 and 92 of FIG. 6 are closed thereby short-circuiting and discharging the capacitors connected in parallel therewith. This has the effect of initializing the affected amplifier circuits to a zero condition.

In addition to contacts K12 being opened when coil K18 is deenergized, contacts K4, connected in parallel with amplifier 128 of FIG. 7, are also open since coil 185 of relay K4 (FIG. 10) is deenergized. Again, coil 185 is, ultimately, deenergized because contacts K9 are open. Consequently, amplifier 128 is connected in an integrating configuration because of the feedback capacitor 129 and begins operating at time T0.

As noted, especially relating to FIG. 7, a predetermined potential is applied to the input of amplifier 128. Amplifier 128. Amplifier 128 operates as an integrating network and produces a time varying signal, for example a ramp signal, at the output thereof. In addition, the input signal is applied as an input to amplifier 132 which is connected as a amplifier having unity gain. Amplifier 132 provides a signal to compensate for the inherent delays of amplifier 142, and relays K9, K2 and K8 as well as SCS 145. The output of amplifier 132 is attenuated by variable resistor 136, if necessary, and summed with the output of amplifier 128 at summing junction 141. A suitable constant potential is further summed at terminal 141 via resistor 140 to insert suitable offset-voltage compensating signals at the junction 141.

The summed signal at terminal 141 is supplied at an input of amplifier 142. Amplifier 142 is connected as a comparator with the Zener diode 143 in the feedback network. When a predetermined signal is applied at terminal 141, amplifier 142 switches, step-wise, to produce a signal at the output thereof. Typically, this step signal occurs 600 milliseconds after amplifier 128 began integration, viz time T2. This signal is applied to the trigger input of amplifier SCS 145 to render SCS 145 conductive. When SCS 145 is conductive, a suitable signal is applied via closed contacts K4 to coil 147 of relay K9. Energization of coil 147 causes closure of contacts K9.

When contacts K9 are closed, a +15 volt signal is applied across coils 157 and 159 of relays K2 and K8, respectively, and via diode 155 across coil 156 of relay K12. The +15 volt signal energizes each of the listed coils at time T2. Energization of coil 157 of relay K2 causes normally closed contacts K2 associated with the inputs of amplifiers 44, 58, 79 and 92 to open thereby disconnecting the input signals therefrom such that the integrating operation of the amplifiers ceases. In addition, energization of coil 159 of relay K8 causes closure of contacts K8 at time T2 whereby a signal is supplied to the base of transistor 153 at time T3. This signal is differentiated by capacitor 149 and resistors 148 and 150 such that a pulse of approximately 8 milliseconds duration is applied at the base of transistor 153 rendering the transistor conductive, the effect of which is described subsequently.

The energization of coil 156 of relay K12 at time T2 energizes contacts K12 which are connected in parallel with amplifier 128 thereby shorting capacitor 129 so that amplifier 128 is initialized and made ready for further operation. However, so long as contacts K12 (or K4) are closed, amplifier 128 is inoperative.

Conduction by transistor 153 (as a result of energization of coil 147 of relay K9) causes current flow in, and energization of coil 154 of relay K7. Energization of coil 154, about 1 millisecond after energization of coil 147, causes closure of contacts K7 at time T3. Closure of contacts K7 causes energization of coil 160 of relay K11. Energization of coil 160 closes the normally open contacts K11 of FIG. 10 whereby a +15 volt signal is applied across the capacitor 181 to charge same. In addition, energization of coil 160 opens normally closed contacts K11 of FIG. 10 so that the +15 volt signal is not supplied directly to the base of transistor 184. Thus, while coil 160 of relay K11 is energized (viz while transistor 153 is conductive) capacitor 181 is charged but transistor 184 is not switched to the conductive condition.

Energization of coil 160 further operates to close contacts K11 (FIG. 11) whereby a high level signal is applied via the normally closed contacts K18 (of deenergized relay K18) to multiplexer 24. Multiplexer 24 is, therefore, rendered operative to step the scanner portion thereof at time T3 wherein the output signal of a subsequent channel comprising the photosensing apparatus is operated upon. The output signal from the new channel is delivered along line 192 to the input of the system, for example terminal 30. Thus, the circuit shown in FIG. 7 provides the basic timing control for the circuit.

In addition, while contacts K7 are closed, a signal is supplied via closed contacts K21 to energize coil 163 of relay K3 at time T3. When coil 163 is energized, normally open contacts K3 associated with the inputs of amplifiers 49 and 64 of FIG. 5 are closed. This permits the transfer of the signals stored in integrating amplifiers 44 and 58 to be stored in amplifiers 49 and 64, respectively. In addition, the signal produced by memory amplifier 49 is applied to squaring circuit 85 and, thence, to amplifier 86. The signal produced by amplifier 86 is summed with the intergration signal produced by memory amplifier 58 at the junction of resistors 59 and 60 and supplied to memory amplifier 64 therewith. This transfer must take place within the 8 millisecond time period during which transistor 153 is operative. Moreover, the transfer must be complete prior to the closing of input contacts K2 which measures the associated integrator for operating again when the shorting contacts K4 are opened.

When the 8 millisecond signal supplied to the base of transistor 153 terminates at time T4, transistor 153 is rendered nonconductive wherein coil 154 is deenergized such that contacts K7 open and no signal is applied to coils 163 and 160. Thus, the transfer contacts K3 at the inputs of amplifier 49 and 64 are switched to the open condition while each set of contacts K11 (FIG. 10) revert to the conditions shown such that the signal stored in capacitor 181 is discharged through the closed contacts K11 to the base of transistor 184. This signal renders transistor 184 conductive at time T5 such that current flows through coil 185 of relay K4 for about 3 milliseconds. Energization of coil 185 causes contacts K4 associated with amplifiers 44, 58 and 128 to be closed thereby short circuiting these amplifiers and returning same to the initial condition. Moreover, closure of contacts K4 renders the associated integrating amplifiers inoperative.

When coil 185 of relay K4 is energized, contact K4 in series with coil 147 are opened such that coil 147 of relay K9 is deenergized and SCS 145 is turned off at time T5. Consequently, contacts K9 open and the coils of relays K2, K8 and K12 are deenergized shortly thereafter as determined by the "operate-time" of relay K9. As a result of this action, contacts K8 open and the base of transistor 153 is disconnected. As well, input contact K2 of integrating amplifiers 128, 44, 58, 79 and 92 are closed. However, amplifiers 128, 44 and 58 are inoperative due to the shorted condition of the parallel contacts K4 while amplifiers 79 and 92 are inoperative due to the open contacts K4 in the input circuit thereof.

After capacitor 181 is discharged, coil 185 of relay K4 is deenergized at time T6. Contacts K4 connected to the coil of relay K9 are closed but SCS 145 is inoperative. Furthermore, the contacts K4 associated with the integrating amplifier assume the conditions wherein the amplifiers are rendered operative. For example, amplifiers 44 and 58 integrate the input signals from the scanner while amplifier 79 and 92 integrate the $\overline{Y}$ and $\sigma^2$ signals supplied by amplifiers 49 and 64, respectively. Most importantly, amplifier 128 begins its operation and produces the time varying signal which is supplied to comparator amplifier 142 whereby the basic timing operation is controlled.

Further input signals are supplied to terminal 30 and, thence to integrating amplifiers 44 and 58, by a second and subsequent scanning operation. The operation between times T6 and T7 continues substantially as described from times T0 to T6. For example, the initial operation described supra may represent a signal supplied by a first channel comprising a source 23 and sensor 26 in the measuring apparatus 10. The signals subsequently supplied are presented as functions of further sources and sensors in the measuring apparatus 10. Again, these signals are supplied to integrator amplifiers 44 and 58 via normally closed contacts K2 and operated thereupon. Moreover, since contacts K2 and input contacts K4 are now closed, the signals which have been stored in storage amplifiers 49 and 64 are supplied to integrating amplifiers 79 and 92, respectively. The output of integrating amplifiers 79 and 92 are supplied via coupling resistors 80 and 93 to normally open contacts K5, respectively.

Normally open contacts K5 associated with the inputs of memory amplifiers 83 and 96 interrupt the signal flow until a full scan operation is completed. Contacts K5 are operated only when coil 162 (FIG. 7) of relay K5 is energized. Coil 162 is energized only when coil 154 of relay K7 is energized concurrently with coil 203 of relay K21 (FIG. 9). Coil 203 is energized, via normally closed contacts K3 (FIG. 9), by the application of the +15 volt source across coil 203 upon closure of the low limit switch in counter 208. That is, after the counter or scanner has scanned each of the channels in the measuring apparatus 10, amplifiers 79 and 92 will have integrated the total signals supplied thereto. When the last channel has been scanned, the scanner switches to the low limit (for example, channel 00) and closes a switch therein at time T6. The +15 volt signal is supplied via normally closed contacts K3 and energized coil 203 of relay K21 at time T7 which is a function of the scanner operating speed, for example, 4 to 10 milliseconds. When coil 203 of relay K21 is energized, one set of contacts K21 (FIG. 7) are closed wherein coil 162 of relay K5 is energized at time T11 when relay K7 is energized. Another set of contacts K21 are opened such that coil 163 is deenergized. When coil 162 is energized, contacts K5 associated with the inputs of amplifiers 83 and 96 are closed wherein the integrated signal is transferred from amplifier 79 to amplifier 83 and from amplifier 92 to amplifier 96, respectively, between times T11 and T12. Of course, contacts K2 associated with the inputs of amplifiers 79 and 92 have previously opened to terminate the input integrating signal at time T10. That is, the timing circuit shown in FIG. 7 has produced a signal across SCS 145 which is effective to energize coil 147 of relay K9 at time T10. When coil 147 is energized, contacts K9 are closed thereby energizing coil 157 of relay K2 such that the contacts K2 are opened.

The output of amplifier 83, namely $\overline{\overline{Y}}$, is applied to the monitor 84. The signal $\overline{\overline{Y}}$ indicates the average mean density of the plurality of sample areas which have been examined by the sensing element 10. This signal is recorded on a suitable monitor such as a chart recorder or the like.

In addition, the $\overline{\overline{Y}}$ signal is applied as one input of amplifier 105 (via resistor 103) and one input of amplifier 109 (via resistor 107). The $\overline{\overline{Y}}$ signal is summed at the inputs of amplifiers 105 and 109 with constant reference potentials supplied via variable resistors 115 and 116, respectively. Amplifiers 105 and 109 are connected as comparator circuits with Zener diodes 104 and 108, respectively, in the feedback networks. Amplifier 105 has the function of producing an output signal when the $\overline{\overline{Y}}$ signal is higher than the allowed condition as represented by the reference signal. Amplifier 109 has the function of detecting when the $\overline{\overline{Y}}$ signal is below the allowed value. When amplifier 105 or amplifier 109 switches, a signal is supplied to coil 118 or coil 119, respectively. These coils cause closure of contacts (not shown) of relays K15 and K16, respectively, whereby suitable alarms are made such as at times T9 and T10, for example.

The average variance $\overline{\sigma^2}$ of the plurality of samples is also supplied to monitor 84 from the output of amplifier 96. It is understood that monitor 84 may comprise a plurality of strip charts or the like wherein the $\overline{\overline{Y}}$ and $\overline{\sigma^2}$ signals may be separately recorded.

In addition, the output from amplifier 96 is connected, via resistor 111, to an input of amplifier 113. A further input supplied via resistor 112 from variable resistor 117 is summed with the $\overline{\sigma^2}$ signal at the input of amplifier 113. Amplifier 113 is connected as a comparator circuit and switches its condition upon the input signal being higher than the allowed value for the average variance. When amplifier 113 is operated, a signal is applied through coil 120 of relay K17. Energization of coil 120 causes closure of the contacts (not shown) of relay K17 whereby a suitable alarm is made such as at time T8, for example. Suitable action is taken to correct the web production or to mark the web at the indicated areas.

Of course, in the event that the web is not defective no alarm signals are produced. Consequently, the web handling apparatus continues to function as, for example, by reeling the web.

At time T12, transistor 153 turns off such that relay K7 is deenergized. Thus, relay K11 is deenergized such that relay K4 is energized at time T13 to short circuit amplifiers 44, 58 and 128 for initialization. In addition, relay K13 is deenergized such that transistor 199 is rendered conductive. Transistor 199 thus energizes relay K6 at time T13 such that amplifiers 49, 64, 79 and 92 are short circuited and initialized.

Since scanner 24 was stepped (via relay K11) at time T10, the low limit scanner switch is opened within the scanner operating time requirements (i.e., 4 to 10 milliseconds). Relay K21 (at coil 203) is maintained energized through the operation of the tank circuit comprising capacitor 202 and resistor 201. Thus, contacts K21 of FIG. 7 are in the operative condition (opposite to those shown) even though the scanner switch is open. After the scanner is stepped at time T11, the circuit operation continues, as before, controlled by the basic timing control circuit, through to and beyond time T18.

A manually controlled system stop is initiated (arbitrarily) at time T20 by closing switch 179 and energizing coil 174 of relay K19. This action closes contacts K19 (FIG. 9) such that relay K18 is energized when scanner 24 is stepped to the low limit condition at time T21 via relay K11 when relay K18 is energized, the chart drive 207 is halted. Also, the computer system stops operation since relay K12 is energized via contacts K18 of FIG. 7. This action short circuits amplifier 128 and halts the timing control circuit. Incidently, diode 155 is reverse biased at this time and closure of contacts K18 does not energize the coils of relays K2 and K8.

In addition, the output from amplifier 49 (the $\overline{Y}$ signal) is supplied to an input of amplifier 99 via resistor 97. A reference potential is supplied to the input of amplifier 99 via the voltage divider network comprising resistors 100 and 101. The inputs are summed at amplifier 99 which is connected as a comparator. When the input reaches a predetermined level as shown (arbitrarily) at time T19 of FIG. 12, amplifier 99 energizes coil 102. In the energized condition, coil 102 of relay K14 is effective to close normally open contacts K14 (FIG. 9). This has the effect of selectively connecting the +15 volt source across coil 204 of relay K18 when counter 208 of scanner 24 has counted to the low limit. In addition, energization of coil 102 of relay K14 is effective to close the contacts on a suitable alarm (not shown) which is indicative of a break in the fabric under investigation.

Thus, if the fabric breaks, i.e. there is a complete tear, the scan operation continues until a full scan is completed and the scanner is stepped to the low limit position. When coil 204 is energized, as described supra, recorder 207 is deactivated along the remainder of the computer circuit due to the selective energization of relay K12. It should be noted herewith that the automatic and manual stop operations need not be related but are so shown in FIG. 12 for convenience only.

Referring specifically to FIG. 8, the calibration cycle operation is described. Coil 171 of the balance relay (BAL) is energized when switch 175 is closed. Operation of the BAL relay effectively disconnects the input to each amplifier and shorts the differential input arrangement thereof (not shown) such that the input signal is 0 volts. Under these conditions, the output voltage produced by each amplifier should be also 0 volts. When in the balance mode, adjustments are made to the individual amplifiers to achieve the 0 volt output signal.

When switch 176 is closed, coil 172 of relay K1 is energized wherein the contacts K1 of FIG. 5 are operated. Thus, the normally closed contacts K1 are opened such that further input signals are not provided to amplifier 121. Moreover, the normally open contacts K1 are closed such that a controlled input signal is supplied to the amplifier. This controlled input signal permits testing of the average density channel.

When switch 177 is closed, coil 173 of relay K20 is energized. Energization of coil 173 operates to change the conditions of contacts K20 of FIG. 5. Thus, normally closed contacts K20 at the output of amplifier 64 are opened such that amplifier 64 cannot supply a signal across attenuator resistor 87. Conversely, normally open contacts K20 are closed such that a test signal from amplifier 121 is now applied to attenuator 87. Each of the latter three operations are used to test the operation of the amplifier or the channels.

In addition, the photosensors 26 shown in FIG. 3 are further calibrated by the Null circuit shown in FIG. 5 which is controlled by switch 178. Typically, during calibration, the output of amplifier 121 is connected to a contact of switch 65 or 69. Each contact represents a different amplifier channel. Initially, the output of amplifier 121 is connected via switches 65 and 69 to ground through the series network comprising variable resistor 66, resistor 67, meter 68 and normally closed contacts K10. This signal is a function of the signal supplied at terminal 30. As noted from FIG. 3, the signal supplied at terminal 30 is a function of the current supplied by the individual photosensor through the individual variable resistor 70 in accordance with the closure of relay contacts KSx.

The signal at the output of amplifier 121 is supplied across meter 68 to ground. In the preferred embodiment, in the calibration mode, the variable resistor 70 associated with the closed contact KSx is varied until the meter 68 reads a predetermined voltage value, for example +5.0 volts. This provides a coarse adjustment of the output signal produced at terminal 30 by the specific photosensor being calibrated.

After the coarse adjustment has been made, Null switch 178 is closed whereby coil 170 of relay K3 is energized. Energization of coil 170 closes the normally open contacts K10 and opens the normally closed contacts K10 shown in FIG. 5. Thus, resistors 66 and 67 are short circuited by the closed contacts K10 while meter 68 is connected to the junction between resistors 33 and 34 instead of to ground. The junction of resistors 33 and 34 are maintained at +5.0 volts as a precision voltage source. The signal appearing across meter 68 now represents the difference between the +5 volt source signal supplied at terminal 30 and the precision signal. By further fine adjustment of the pertinent variable resistor 70, meter 68 is nulled to read 0 volts wherein the output signal produced by the particular photosensor channel is substantially identical to +5.0 volts. This +5.0 volt signal is defined as being the full scale signal supplied when there is no fabric in the sensing head 11 of measuring apparatus 10 whereby 100% light transmission from the light source to the photosensor occurs. This calibration is utilized to insure identical operation and indication by the computer for each channel which investigates the associated segment of the fabric.

The last coil shown in FIG. 8, namely coil 174 of relay K9 is selectively energized by closure of switch 179. Energization of coil 174 causes closure of contact K13 of FIG. 9 such that counter 208, upon reaching lower limit closure, energizes coil 204 of relay 218. When coil 204 is energized, relay contacts K18 are closed, thereby supplying a +15 volt source to the chart stop apparatus 207 such that the chart drive is terminated. Thus, the chart drive portion of device 207 can be stopped manually by operating switch 179 or automatically by production of a signal by amplifier 99 which indicates fabric breakage.

The subject invention may then be considered as a photoelectric sensing apparatus which provides signals to a computing network; a computing network having a plurality of channels which operate on signals produced by the photoelectric sensing apparatus and which produces signals which are indicative of designated properties of a fabric or web which is being investigated; and a timing circuit which controls the operation of the computing circuit channels such that individual signals for individual scanning or sampling areas are produced and composite signals are produced for each of the scanning areas of a particular scanning cycle. Moreover, various control circuits are utilized to produce stepping signals, as a function of the computer operation as controlled by the timing circuit, such that different portions of the photoelectric apparatus are sequentially operated during a scanning cycle. In addition, other control circuits are utilized to provide means for selectively testing and/or calibrating the timing and computing circuits.

It will be clear to those skilled in the art that modifications may be made to the subject invention. For example, the scanning cycle may include any desirable number of scanning areas. In addition, the voltage levels designated are not meant to be limitative of the invention. These and other modifications which may be conceived by those skilled in the art and which fall within the inventive precepts hereinabove noted, are meant to be included within this description.

The embodiments of the invention in which an exclusive property or privilege is claimed are defined as follows:

1. Apparatus for determining the uniformity of web material comprising, in combination,
a plurality of light source means,
a corresponding plurality of photoelectric light sensing means, each producing an electric signal proportional to the intensity of the light falling thereon,
each of said light sensing means being arranged to respond to light emitted by a corresponding one of said light source means, said web material being arranged to pass between said light source means and said light sensing means whereby to modulate the intensity of said light falling on said light sensing means as a function of the density of said web material,
computing circuit means,
multiplexing means for sequentially and selectively connecting said light sensing means to the input of said computing circuit means,
said computing circuit means including a first and a second computing channel and timing control means for establishing predetermined time intervals and timed sequences within said time intervals,
said first computing channel being responsive to said electric signals from said light sensing means to produce a first derived signal proportional to the means density of selected ones of predetermined portions of said web material, and to produce a second derived signal proportional to the average mean density of a predetermined plurality of said predetermined portions,
said second computing channel being responsive to said electric signals for producing a third derived signal proportional to the variance of the density of said selected portions of said web material from said mean density, and a fourth derived signal proportional to the average of said variance of said plurality of said predetermined portions, and
means responsive to said second and fourth derived signals for indicating the value of said signals as a measure of the uniformity of said web material.

2. The invention set forth in claim 1 characterized by the addition of alarm means responsive to said first derived signal to indicate a flaw in said web material.

3. The invention set forth in claim 1 characterized by the addition of alarm means responsive to said second and fourth derived signals to indicate a deviation of those signals beyond predetermined limits.

References Cited

UNITED STATES PATENTS

| | | | |
|---|---|---|---|
| 3,001,080 | 9/1961 | Neil | 250—219 |
| 3,135,867 | 6/1964 | Daneff | 250—219 |
| 3,388,261 | 6/1968 | Roberts et al. | 250—219 X |
| 3,409,779 | 9/1968 | Fertig | 250—219 |
| 3,419,723 | 12/1968 | Germans | 250—219 |

OTHER REFERENCES

P. P. Briggs: Computer Controlled Chromatographs, from Control Engineering, September 1967, pp. 75–80.

MALCOLM A. MORRISON, Primary Examiner

F. D. GRUBER, Assistant Examiner

U.S. Cl. X.R.

235—151.13, 151.3, 193, 197; 250—219; 356—200